(12) United States Patent
Sion et al.

(10) Patent No.: US 10,921,421 B2
(45) Date of Patent: Feb. 16, 2021

(54) RADAR MODULE

(71) Applicant: NXP USA, INC., Austin, TX (US)

(72) Inventors: Arnaud Sion, Munich (DE); Ralf Reuter, Landshut (DE); Shamsuddin Ahmed, Munich (DE); Ernst Seler, Munich (DE)

(73) Assignee: NXP USA, INC., Austin, TX (US)

( * ) Notice: Subject to any disclaimer, the term of this patent is extended or adjusted under 35 U.S.C. 154(b) by 179 days.

(21) Appl. No.: 16/117,568

(22) Filed: Aug. 30, 2018

(65) Prior Publication Data

US 2019/0107600 A1    Apr. 11, 2019

(30) Foreign Application Priority Data

Oct. 9, 2017 (EP) ..................... 17195389

(51) Int. Cl.
*G01S 7/03* (2006.01)
*G01S 13/931* (2020.01)
*H01Q 3/34* (2006.01)
*H01Q 23/00* (2006.01)
*H01Q 21/00* (2006.01)
*H01Q 3/40* (2006.01)

(52) U.S. Cl.
CPC ............ *G01S 7/032* (2013.01); *G01S 13/931* (2013.01); *H01Q 3/34* (2013.01); *H01Q 3/40* (2013.01); *H01Q 21/0093* (2013.01); *H01Q 23/00* (2013.01)

(58) Field of Classification Search
CPC ......... G01S 13/931; G01S 7/032; H01Q 3/34; H01Q 21/0093; H01Q 23/00; H01Q 3/40
See application file for complete search history.

(56) References Cited

U.S. PATENT DOCUMENTS

| 8,791,854 | B2 | 7/2014 | Forstner et al. |
| 2009/0251362 | A1* | 10/2009 | Margomenos ........ G01S 13/931 342/175 |
| 2010/0225539 | A1 | 9/2010 | Margomenos et al. |
| 2012/0146842 | A1 | 6/2012 | Kang |

(Continued)

FOREIGN PATENT DOCUMENTS

CN          105182297 A       12/2015

OTHER PUBLICATIONS

Sickinger, F., "76-81GHz Fully Planar and Array Compatible LTCC Antenna Element for Automotive Radar Sensors", Proceedings of the 46th European Microwave Conference, EuMA 2016.

(Continued)

*Primary Examiner* — Timothy X Pham

(57) ABSTRACT

A radar module (100; 200) comprises a low temperature co-fired ceramic, LTCC, substrate (101; 201), with a radar chip (102; 202) attached to a first surface (101*a*; 201*a*) of the LTCC substrate (101; 201) and a transmitting antenna (105, 106) for transmitting the radar signal attached to a second surface (101*b*; 201*b*) of the LTCC substrate (101; 201). The radar chip (102; 202) is configured to generate a radar signal for transmission. The transmitting antenna (105, 106) is configured to communicate with the radar chip (102; 202) through the LTCC substrate (101; 201). The radar module (100; 200) further comprises a beam steering element (205) configured to introduce a phase delay to the radar signal in order to adjust a first component of a direction of transmission of the radar signal.

20 Claims, 2 Drawing Sheets

(56) References Cited

U.S. PATENT DOCUMENTS

2012/0146881 A1    6/2012  Mckinzie, III
2014/0071018 A1*   3/2014  Pan .......................... H01Q 1/20
                                                            343/867

OTHER PUBLICATIONS

Attaran, A., "Fabrication of a 77GHz Rotman Lens on a High Resistivity Silicon Wafer Using Lift-Off Process", International Journal of Antennas and Propagation, vol. 2014, Article ID 471935, 9 pages, May 2014.

* cited by examiner

RADAR MODULE

CROSS-REFERENCE TO RELATED APPLICATIONS

This application claims the priority under 35 U.S.C. § 119 of European Patent application no. 17195389.6, filed on 9 Oct. 2017, the contents of which are incorporated by reference herein.

FIELD

The disclosure relates to a radar module, for example a millimetre-wave radar module.

BACKGROUND

It is desirable to minimise the size and cost of radar modules, particularly for automotive applications. However, radar modules combine multiple technologies with different performance characteristics. It is difficult to achieve high integration of such technologies within a small space without limiting functionality of the technologies.

SUMMARY

According to a first aspect of the disclosure there is provided a radar module comprising: a low temperature co-fired ceramic, LTCC, substrate; a radar chip attached to a first surface of the LTCC substrate and configured to generate a radar signal for transmission; and a transmitting antenna for transmitting the radar signal, the transmitting antenna attached to a second surface of the LTCC substrate and configured to communicate with the radar chip through the LTCC substrate; wherein the radar module further comprises a beam steering element configured to introduce a phase delay to the radar signal in order to adjust a first component of a direction of transmission of the radar signal.

This combination of features provides a radar module with high levels of integration of functionality, but with a minimal size. The use of an LTCC substrate enables use of millimetre-wave (mmW) layouts, such as the Rotman lens and two feeding point antenna described below, as well as allowing routing on both the first and second surfaces of the substrate and in intermediate layers of the substrate. LTCC also has superior mechanical and thermal characteristics compared to conventional substrate materials such as FR4. The radar module of the present disclosure uses these properties to create the smallest possible module, whilst still enabling beam steering of the transmitted radar signal.

In some embodiments, the beam steering element may be a beam forming layer incorporated into the LTCC substrate. In particular, the beam forming layer may comprise a Butler matrix or a Rotman lens. The beamforming layer may comprise first and second conductive layers separated by a layer of LTCC material.

A beam forming layer such as a Butler matrix or Rotman lens passively introduces a phase delay into the radar signal being communicated from the radar chip to the transmitting antenna, thus allowing beam steering in one dimension (e.g. azimuthal or elevational beam steering). In particular, the radar module may comprise a plurality (e.g. two or three or more) of transmitting antennas attached to the second surface of the LTCC substrate. The beam forming layer may be configured to introduce a different phase delay into the respective radar signal received by each transmitting antenna of the plurality of transmitting antennas.

In some embodiments the radar chip may comprise a phase rotator configured to adjust the phase of the radar signal. The phase rotator may be configured to further control the phase of the transmitted radar signal. This may permit finer control of the transmitted beam direction.

In some embodiments, the beam steering element may comprise (or may be) a phase rotator configured to generate a first phase rotated signal and a second phase rotated signal from the radar signal, the phase of the first phase rotated signal differing from the phase of the second phase rotated signal by a signal phase difference. The transmitting antenna element may comprise a first feeding point configured to receive the first phase rotated signal from the phase rotator, and a second feeding point configured to receive the second phase rotated signal from the phase rotator, such that the transmitting antenna transmits a resultant radar signal in a direction having the first component determined by the signal phase difference.

In contrast to a beam forming layer, the phase rotator actively adjusts the phase of the radar signal. Two phase rotated signals are transmitted by the same transmitting antenna, interfering with each other to create a resultant beam propagating along a direction, one component of which (e.g. an azimuthal or elevational component) is determined by the phase difference between the two phase rotated signals.

In some embodiments, the beam steering element may comprise a power amplifier in addition to the phase rotator. The power amplifier may be configured to control the amplitude of the first and/or second phase rotated signals. In particular, the power amplifier may generate a difference in amplitude between the first phase rotated signal and the second phase rotated signal. Adjusting the relative amplitude difference as well as the phase difference of first and second phase rotated signals allows the beam steering element to further control the direction of the resultant beam generated when the first and second phase rotated signals are transmitted. In particular, one component (e.g. an azimuthal or elevational component) of the direction of the resultant beam may be determined by the phase difference and the amplitude difference between the two phase rotated signals.

In some embodiments, the phase rotator and/or power amplifier may be incorporated into the radar chip, further minimising the size of the radar module.

In some embodiments, the transmitting antenna may be a first transmitting antenna, and the radar module may further comprise a second transmitting antenna for transmitting the radar signal (or a different radar signal), wherein the second transmitting antenna is configured to communicate with the radar chip through the LTCC substrate. The second transmitting antenna may for example be configured to transmit a non-phase rotated radar signal received from the radar chip, or a phase rotated signal having a phase difference relative to the first and/or second phase rotated signals. Such arrangements may allow further control of the direction of the radar beam transmitted by the radar module.

In such embodiments, the phase rotator may be further configured to generate a third phase rotated signal and a fourth phase rotated signal from the radar signal. The second transmitting antenna may comprise a first feeding point configured to receive a third phase rotated signal from the radar chip, and a second feeding point configured to receive a fourth phase rotated signal from the radar chip.

The third phase rotated signal may have a phase difference relative to the first, second, or fourth phase rotated signals. The fourth phase rotated signal may have a phase difference relative to the first, second, or third phase rotated signals.

In some embodiments, the radar module may further comprise a plurality of receiving antennas (e.g. an array of receiving antennas) for receiving a received radar signal, the plurality of receiving antennas attached to the second surface of the LTCC substrate and configured to communicate with the radar chip through the LTCC substrate. The radar chip may be configured to process the signals received by each receiving antenna of the plurality of receiving antennas to determine a second component of a direction of arrival of the received radar signal.

In other words, the radar chip is configured to provide digital beam steering of received radar signals. In conjunction with the beam steering of the transmitted signal provided by the beam steering element, this allows radar signals to effectively be steered in two dimensions. For example, the second component of the direction of arrival determined by the radar chip may be orthogonal to the first component of the direction of the transmitted radar signal (e.g. azimuthal and elevational beam steering). As the second dimension beam steering is incorporated into the radar module, this arrangement provides a high level of functionality to the radar module with minimal impact on the size of the radar module.

In some embodiments the radar chip comprises a radar front end and a radar microcontroller. For example, the radar chip may be a single chip radar chip or system in package. This minimises the substrate surface required to hold the radar electronics, minimising the size of the module.

In some embodiments, the form factor of the radar module may have dimensions equal to or less than 5 cm×5 cm; or equal to or less than 3 cm×3 cm. The radar module may thus have a very small size.

In some embodiments, the radar module may be a millimetre-wave radar module configured to transmit millimetre-wave radar signals. MM-wave radar signals are those having a wavelength between 1 mm and 10 mm. The radar module may in particular be configured to transmit radar signals having a frequency between 70 Ghz and 85 GHz, for example signals with a frequency of 77 GHz.

In some embodiments, the radar module may be an automotive radar module.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
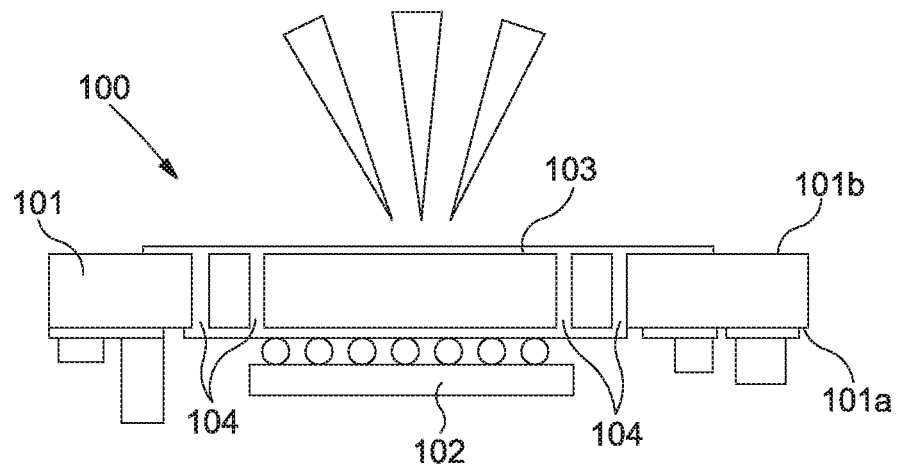
FIG. 1 illustrates a first example of a radar module according to the present disclosure.

It should be noted that the figures are diagrammatic and not drawn to scale. Relative dimensions and proportions of parts of these figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1 shows an example radar module 100. The figure illustrates a cross-section through the module 100. The module 100 comprises a low temperature co-fired ceramic (LTCC) substrate 101, having a first surface 101a and an opposing second surface 101b, A radar chip 102 is attached (e.g. by solder joints) to the first surface 101a of the LTCC substrate 101. The radar chip 102 is an integrated circuit containing the electronics necessary to generate and process radar signals. For example, the radar chip 102 may comprise a radar front and radar microcontroller.

An antenna array 103 is attached to the opposing second surface 101b of the substrate 101. The antenna array 103 is adapted to transmit radar signals generated by the radar chip 102 (as represented by the emitted triangles in the figure). The signals are communicated from the radar chip 102 to a transmitting antenna (shown in FIG. 2) of the antenna array 103 by connections 104. Connections 104 may comprise conductive material running through substrate 101, attaching outputs of the radar chip 102 to one or more antennas of the antenna array 103. The antennas 15, 106, 107 of the antenna array 103 may comprise antenna microstrips, or any other type of antenna element.

Figure 2:
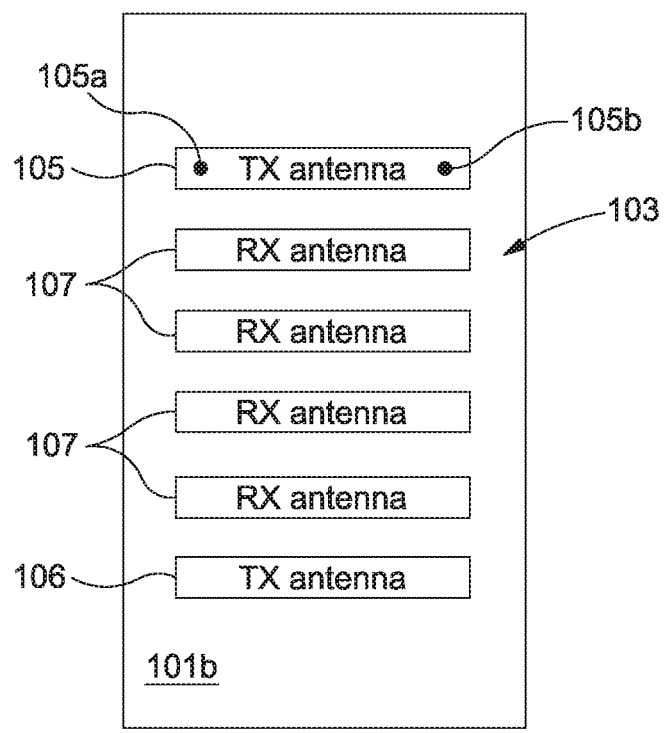
FIG. 2 illustrates a plan view of an antenna array of the radar module of FIG. 1.

FIG. 2 shows a plan view of the antenna array 103 on the second surface 101b of the substrate 101. The antenna array comprises a first transmitting antenna 105, a second transmitting antenna 106, and a plurality of receiving antenna 107. The first transmitting antenna 105 comprises a first feeding point 105a and a second feeding point 105b. Each feeding point 105a, 105b is independently connected to the radar chip 102 by connections 104. The remaining antennas 106, 107 each comprise a single feeding point connected to radar chip 102 by connections 104, for receiving signals from the radar chip 102 and sending received signals to the radar chip 102. In the illustrated example the first feeding point 105a is at a first end of the first antenna 105, and the feeding point 105b is at an opposing second end of the antenna 105b. Other arrangements of feeding points are possible, as would be understood by the skilled person.

The radar chip 102 comprises a phase rotator. The phase rotator acts as a beam steering element. In operation, the phase rotator generates two phase rotated signals from a radar signal intended to be transmitted. The two phase rotated signals have a relative phase difference, referred to herein as the signal phase difference. A first phase rotated signal is communicated to the first feeding point 105a of the first transmitting antenna 105. The second phase rotated signal is communicated to the second feeding point 105b of the first transmitting antenna 105. Thus the first transmitting antenna 105 receives two signals, whose phases differ by the signal phase difference. The two signals interfere with each other, resulting in a resultant wave that is transmitted by the first transmitting antenna 105. The direction of propagation of this resultant wave (i.e. the direction of the central intensity maxima of the resultant wave) is determined, in one dimension, by the signal phase difference (i.e. one component of the direction is determined by the signal phase difference). Thus the radar chip 102 is able to steer the direction of the transmitted signal along one dimension by adjusting the signal phase difference.

The radar chip 102 may further comprise a power amplifier configured to modify the amplitude of the first and/or second phase rotated signals before the first and second phase rotated signals are communicated to the first and second feeding points 105a, 105b respectively. Both the amplitude and phase of the first phase rotated signal may thus be different from the amplitude and phase of the second phase rotated signal, providing further beam steering control.

In the illustrated example, the radar chip 102 is further configured to digitally steer a radar beam in a second dimension, orthogonal to the first dimension. Reflections of the resultant signal transmitted by the first transmitting antenna 105 from a target are received by the plurality of receiving antennas 107. Each receiving antenna 107 communicates the signal it receives to the radar chip 102. The radar chip 102 processes these received signals to determine a direction of the incoming received radar signal. Thus, in effect, the radar chip digitally steers the radar signal transmitted and received by the radar module 100. The digital beam steering of the received radar signal is in a dimension that is orthogonal to the dimension determined by the signal phase difference of the transmitted resultant beam. In particular, the receiving antennas 107 are arrayed in a direction that is perpendicular to the direction of separation of the first 105a and second 105b feeding points of the first transmitting antenna 105, resulting in beam steering in two orthogonal dimensions.

Although four receiving antennas 107 are shown in the illustrated example, the radar module 100 may comprise any number of receiving antennas, for example two, three, five, six, or more. The module 100 may comprise only one transmitting antenna (i.e. the first transmitting antenna 105), or any other number of transmitting antennas. Any transmitting antennas other than the first transmitting antenna 105 may comprise a single feeding point or a first and second feeding point. In the latter case, the transmitting antennas may receive phase rotated signals similarly to the first transmitting antenna 105, in order to direct the beam transmitted by that transmitting antenna. One or more of the transmitting antennas may also be configured to receive radar signals. In some embodiments, the module may not perform digital beam steering of the received radar signal, and may comprise only one receiving antenna, or no dedicated receiving antenna; in the latter case the or a transmitting antenna may be configured to receive the reflected radar signal).

Figure 3:
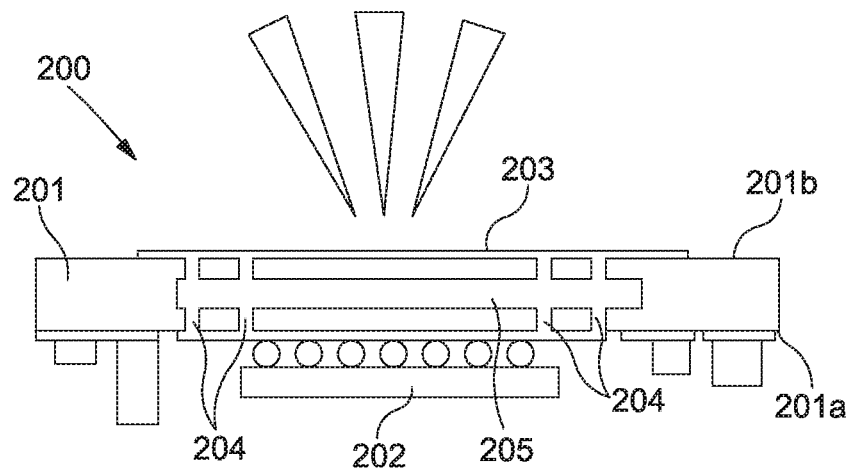
FIG. 3 illustrates an alternative example of a radar module according to the present disclosure.

FIG. 3 shows an example of an alternative radar module 200, which uses an alternative beam steering element to steer a transmitted radar beam. Radar module 200 comprises an LTCC substrate 200 having a first surface 201a and an opposing second surface 201b. A radar chip 202 is attached to the first surface 201a of the substrate 201, similarly to chip 102 in the example above. An antenna array 203 is attached to the second surface 101b of the substrate 101. Connections 204 allow communication between the radar chip 202 and the antenna array 203, similar to connections 104 above. The antenna array 103 comprises a plurality of receiving antennas and at least one transmitting antenna, arrayed similarly to the antennas of the array 103 described above. In contrast to array 103, however, the transmitting antenna or antennas of array 203 each comprise only a single feeding point (i.e. they are standard transmitting antennas).

Radar module 200 further comprises a beam forming layer 205 incorporated into the LTCC substrate 201 (i.e. the beam forming layer 205 is located between the radar module 202 and the antenna array 203). The beam forming layer intercepts radar signals being communicated from the radar module 202 to the transmitting antennas of the antenna array 203. In particular, the connections 204 connect the radar module 202 to the antenna array 203 via the beam forming layer 205.

The beam forming layer 205 is configured to introduce a phase delay to the radar signal received from the radar module 202. In particular, the beam forming layer 205 may be a Rotman lens or a Butler matrix. By introducing a phase delay, a first component of the direction of the radar signal transmitted by the antenna array 203 may be determined (e.g. the azimuthal component or elevation component of the direction may be determined), thus providing beam steering similar to that provided by the module 100 above. In particular, each of a plurality (e.g. two or more) of transmitting antennas in the antenna array 203 receives a signal from the beam forming layer 205 that has a phase difference compared to the signal/s received from the beam forming layer 205 by the other transmitting antennas of the plurality of transmitting antennas.

The radar module 202 is further configured to process received signals from the plurality of receiving antennas in the antenna array 203 in order to digitally steer a second component of the direction of the beam. This operation is similar to the digital beam steering described above in relation to radar module 101. Radar module 202 this provides for beam steering in two dimensions.

Figure 4:
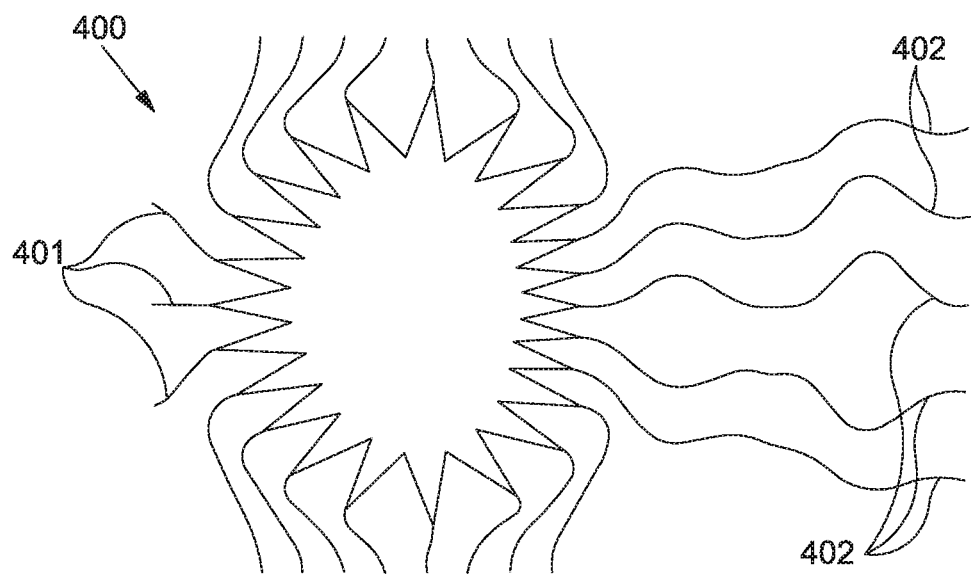
FIG. 4 illustrates an example of a Rotman lens that may be used in the radar module of FIG. 3.

FIG. 4 shows a plan view of an example of a Rotman lens 400 that may be used as the beam forming layer 205. A Rotman lens may particularly be used when the radar module 200 is configured to transmit mm-wave radar signals. The Rotman lens 400 comprises a plurality of beam ports 401 configured to communicate with the radar chip 202 to receive a signal for transmission; and a plurality of array ports 402 at the end of transmission lines for sending beam formed signals to the antenna array 203 for transmission. The Rotman lens delays the phase of signals received at the beam ports 401, generating the phase delay which allows beam steering of the ultimately transmitted signals. The unlabelled ports in FIG. 4 are dummy ports.

The Rotman lens (or beam forming layer in general) may comprise a first layer of conductive material, shaped for example as shown in FIG. 4, and a second layer of conductive material separated from the first layer by insulating material, for example LTCC material. The second layer of conductive material may be shaped similarly to the first layer of conductive material, or may be shaped differently to the first later of conductive material. The beam forming layer may be incorporated into the LTCC substrate 201 by layer-by-layer construction. The beam forming layer may be located approximately centrally within the substrate 201, between the first and second surfaces 101a, 101b. By incorporating a beam forming layer into the substrate 201 in this manner, a radar module with maximal functionality but minimal size may be achieved.

From reading the present disclosure, other variations and modifications will be apparent to the skilled person. Such variations and modifications may involve equivalent and other features which are already known in the art of radar modules, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

What is claimed is:

1. A radar module comprising:
   a low temperature co-fired ceramic, LTCC, substrate;
   a radar chip attached to a first surface of the LTCC substrate and configured to generate a radar signal for transmission; and
   a transmitting antenna for transmitting the radar signal, the transmitting antenna attached to a second surface of the LTCC substrate and configured to communicate with the radar chip through the LTCC substrate;
   wherein the radar module further comprises a beam steering element configured to introduce a phase delay to the radar signal in order to adjust a first component of a direction of transmission of the radar signal, the beam steering element comprising a phase rotator configured to generate a first phase rotated signal and a second phase rotated signal from the radar signal, the phase of the first phase rotated signal differing from the phase of the second phase rotated signal by a signal phase difference;
   wherein the transmitting antenna element comprises a first feeding point configured to receive the first phase rotated signal from the phase rotator, and a second feeding point configured to receive the second phase rotated signal from the phase rotator, such that the transmitting antenna transmits a resultant radar signal in a direction having the first component determined by the signal phase difference.

2. The radar module of claim 1, wherein the beam steering element is a beam forming layer incorporated into the LTCC substrate.

3. The radar module of claim 2, wherein the beam forming layer comprises a Butler matrix or a Rotman lens.

4. The radar module of claim 2, wherein the beam forming layer comprises first and second conductive layers separated by a layer of LTCC material.

5. The radar module of claim 2, wherein the radar chip comprises a phase rotator configured to adjust the phase of the radar signal.

6. The radar module of claim 1, wherein the beam steering element further comprises a power amplifier configured to control the amplitude of the first phase rotated signal and/or the second phase rotated signal.

7. The radar module of claim 1, wherein the phase rotator and/or power amplifier is incorporated into the radar chip.

8. The radar module of claim 1, wherein the transmitting antenna is a first transmitting antenna, and further comprising a second transmitting antenna for transmitting the radar signal, wherein the second transmitting antenna is configured to communicate with the radar chip through the LTCC substrate.

9. The radar module of claim 8, wherein the phase rotator is further configured to generate a third phase rotated signal and a fourth phase rotated signal from the radar signal; and
   wherein the second transmitting antenna comprises a first feeding point configured to receive a third phase rotated signal from the radar chip, and a second feeding point configured to receive a fourth phase rotated signal from the radar chip.

10. The radar module of claim 1, further comprising a plurality of receiving antennas for receiving a received radar signal, the plurality of receiving antennas attached to the second surface of the LTCC substrate and configured to communicate with the radar chip through the LTCC substrate; and
    wherein the radar chip is configured to process the signals received by each receiving antenna of the plurality of receiving antennas to determine a second component of a direction of arrival of the received radar signal.

11. The radar module of claim 10, wherein the second component of the direction of arrival determined by the radar chip is orthogonal to the first component of the direction of the transmitted radar signal.

12. The radar module of claim 1, wherein the radar chip comprises a radar front end and a radar microcontroller.

13. The radar module of claim 1, wherein the form factor of the radar module has dimensions equal to or less than 5 cm×5 cm; or equal to or less than 3 cm×3 cm.

14. The radar module of claim 1, wherein the radar module is a millimetre-wave radar module configured to transmit millimetre-wave radar signals, and/or wherein the radar module is an automotive radar module.

15. A radar module comprising:
    a low temperature co-fired ceramic, LTCC, substrate;
    a radar chip attached to a first surface of the LTCC substrate and configured to generate a radar signal for transmission; and
    a transmitting antenna for transmitting the radar signal, the transmitting antenna attached to a second surface of the LTCC substrate and configured to communicate with the radar chip through the LTCC substrate; and
    a beam steering element formed in the LTCC substrate, the beam steering element configured to introduce a phase delay to the radar signal in order to adjust a first component of a direction of transmission of the radar signal, the beam steering element comprising a phase rotator configured to generate a first phase rotated signal and a second phase rotated signal from the radar signal, the phase of the first phase rotated signal differing from the phase of the second phase rotated signal by a signal phase difference;
    wherein the transmitting antenna element comprises a first feeding point configured to receive the first phase rotated signal from the phase rotator, and a second feeding point configured to receive the second phase rotated signal from the phase rotator, such that the transmitting antenna transmits a resultant radar signal in a direction having the first component determined by the signal phase difference.

16. The radar module of claim 15, further comprising a plurality of receiving antennas for receiving a received radar signal, the plurality of receiving antennas attached to the second surface of the LTCC substrate and configured to communicate with the radar chip through the LTCC substrate; and
    wherein the radar chip is configured to process the signals received by each receiving antenna of the plurality of receiving antennas to determine a second component of a direction of arrival of the received radar signal.

17. The radar module of claim 16, wherein the second component of the direction of arrival determined by the radar chip is orthogonal to the first component of the direction of the transmitted radar signal.

18. The radar module of claim 15, wherein the radar module is a characterized millimetre-wave radar module configured to transmit millimetre-wave radar signals, and/or wherein the radar module is an automotive radar module.

19. The radar module of claim 15, wherein the beam steering element further comprises a power amplifier configured to control the amplitude of the first phase rotated signal and/or the second phase rotated signal.

20. The radar module of claim 15, wherein the transmitting antenna is a first transmitting antenna, and further comprising a second transmitting antenna for transmitting the radar signal, wherein the second transmitting antenna is configured to communicate with the radar chip through the LTCC substrate.

* * * * *